Sept. 17, 1968  J. C. CLARK  3,401,514
FRUIT HARVESTING MACHINE
Filed Oct. 23, 1965  6 Sheets-Sheet 1

INVENTOR.
JOSEPH C. CLARK
BY
Lloyd J. Andres

Sept. 17, 1968

J. C. CLARK 3,401,514

FRUIT HARVESTING MACHINE

Filed Oct. 23, 1965

INVENTOR.
JOSEPH C. CLARK
BY
*Lloyd J. Andres*

Sept. 17, 1968        J. C. CLARK        3,401,514
FRUIT HARVESTING MACHINE
Filed Oct. 23, 1965        6 Sheets-Sheet 3
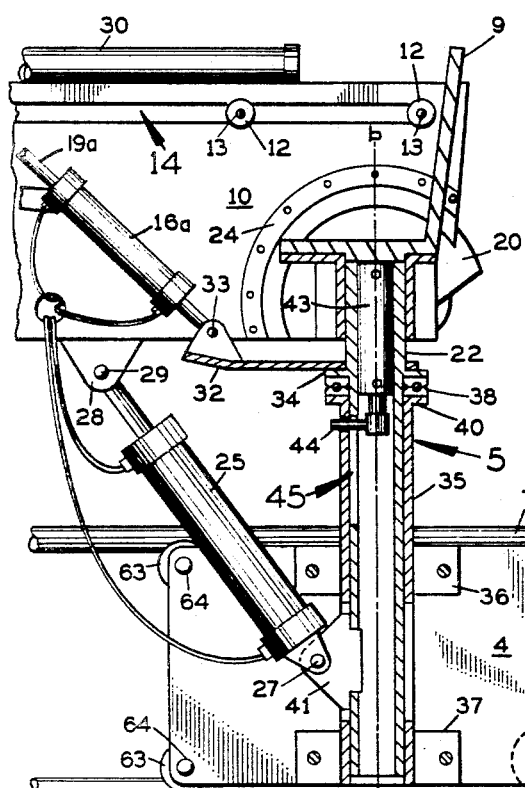
FIG. 5
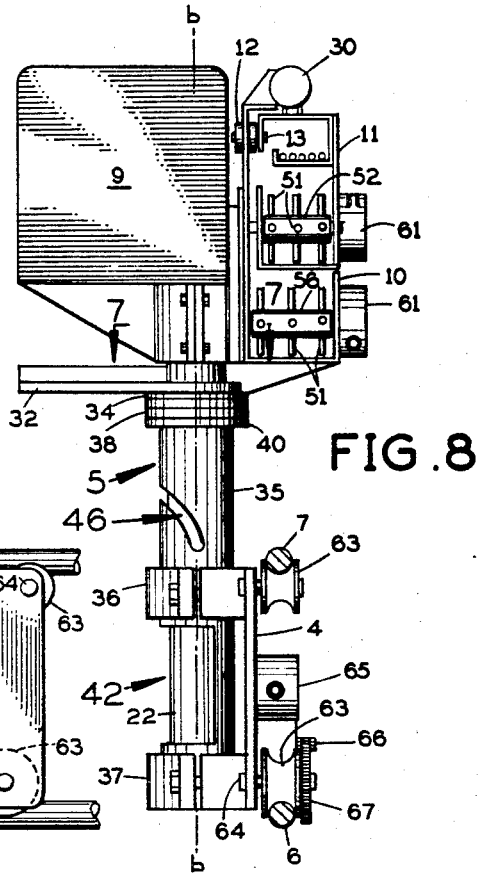
FIG. 8
FIG. 7
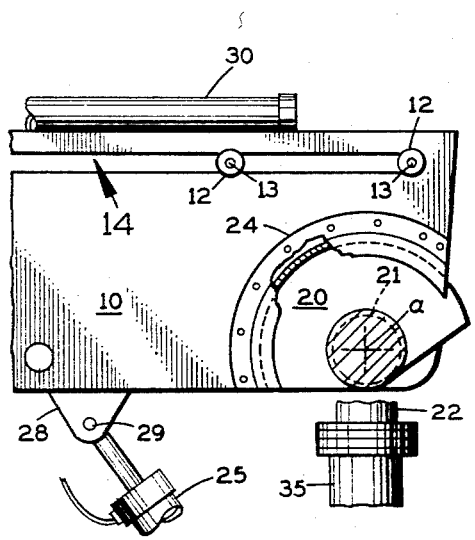
FIG. 6
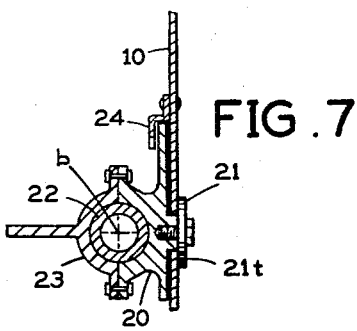
INVENTOR.
JOSEPH C. CLARK
BY
Lloyd Sunders

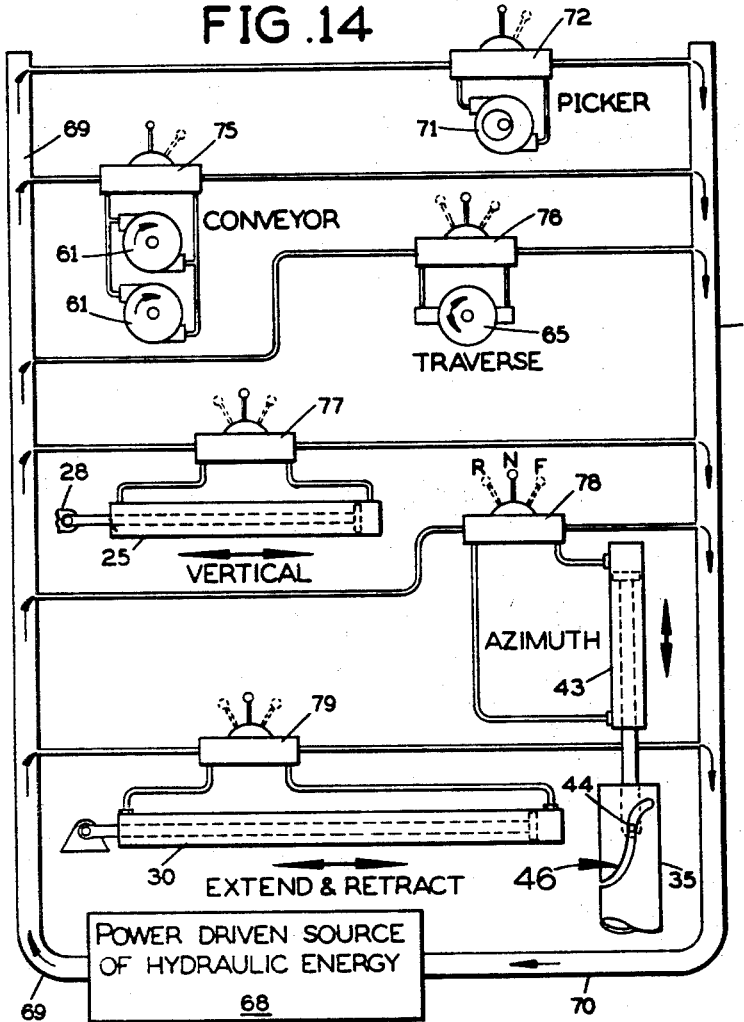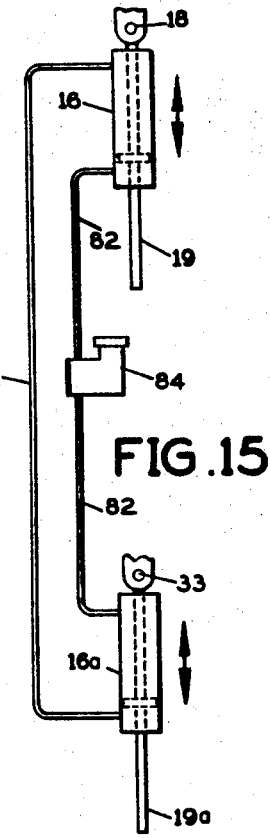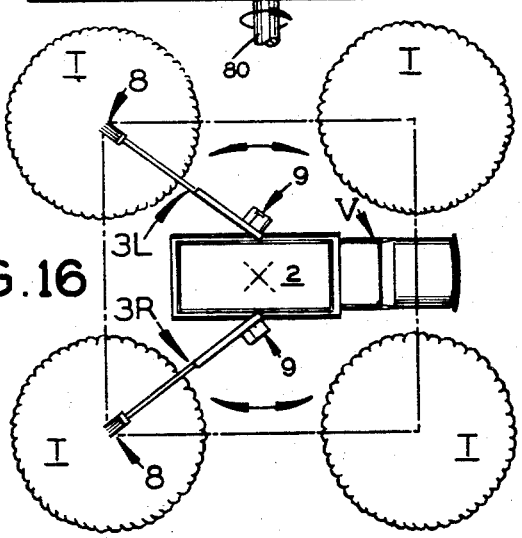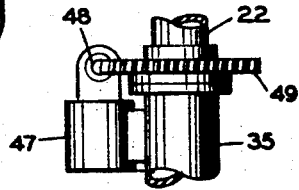

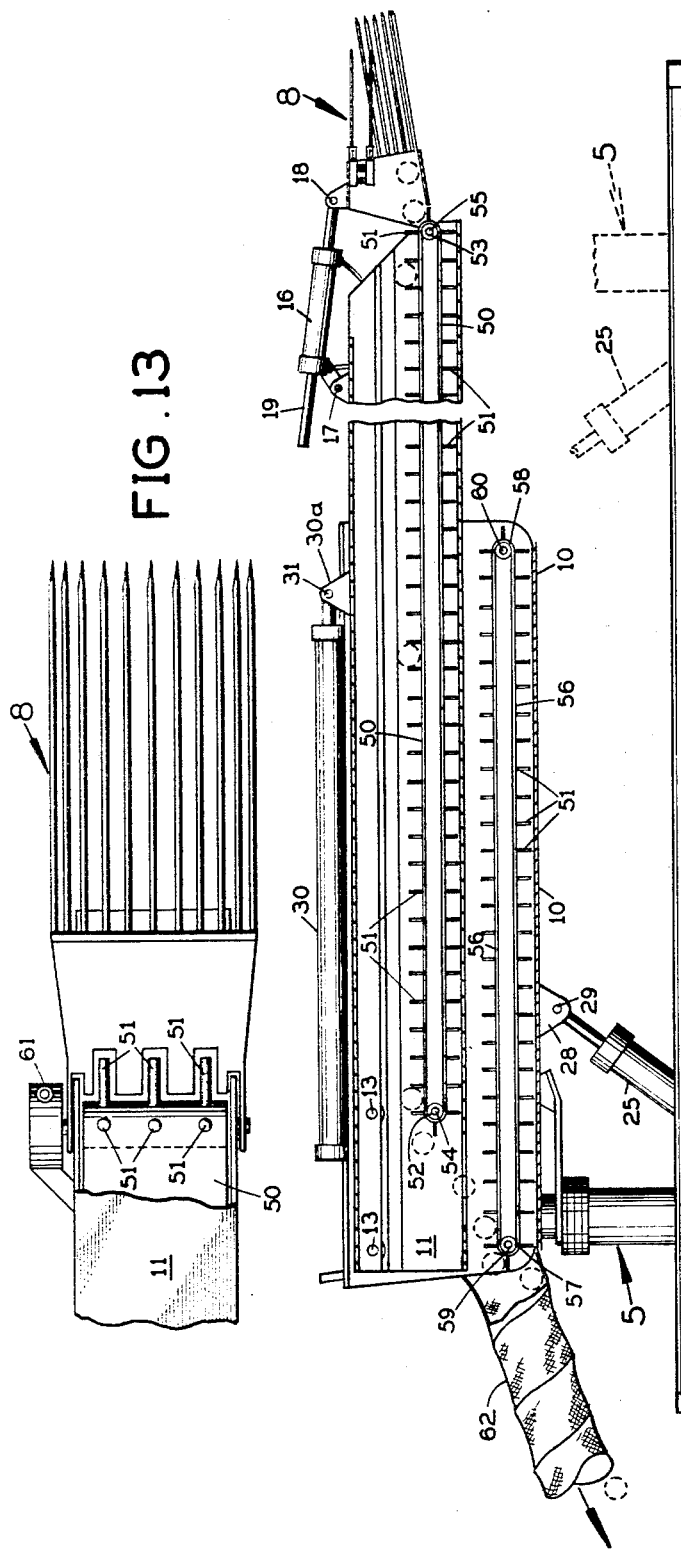

Sept. 17, 1968 J. C. CLARK 3,401,514
FRUIT HARVESTING MACHINE
Filed Oct. 23, 1965 6 Sheets—Sheet 6

INVENTOR.
JOSEPH C. CLARK
BY
Lloyd J. Andres

United States Patent Office 3,401,514
Patented Sept. 17, 1968

3,401,514
FRUIT HARVESTING MACHINE
Joseph C. Clark, 4843 Backacher Lane,
Orlando, Fla. 32806
Filed Oct. 23, 1965, Ser. No. 503,108
5 Claims. (Cl. 56—328)

ABSTRACT OF THE DISCLOSURE

A fruit picking vehicle having thereon a pair of independent hydraulically operated booms, with each having a power driven picking head at the outer end thereof including hydraulic control means operated by a separate operator including controls for the independent extension and retraction of each boom and the vertical and lateral movement of same, as well as the control of the picking head. Each boom also includes a conveyor for moving the picked fruit into the body of the vehicle.

---

This invention relates in general to fruit harvesting machines and more particularly to a power operated land vehicle including machines for picking fruit directly from the trees and conveying same into the box body of the vehicle for transport.

Reference is had to applicant's pending U.S. application Ser. No. 484,051, filed Aug. 31, 1965, which discloses a picking device used in combination with the present invention.

The harvesting of fruit, particularly the citrus variety, is generally accomplished by manually ladder picking the fruit from each tree and depositing same in small cases or containers, which containers in turn are transported to a main conveyance for secondary transport to a box body truck for delivery to the packing plant.

Previous devices for the machine harvesting of fruit utilized shaking machines which vibrated the trunk or branches of the tree and thus dislodged the fruit into collector bins for further manual transfer into cases or other containers for further collective transport. This type mechanical shaking operation often results in serious damage to the fruit, branches of the tree and the root structure thereof and, as a result, the use of such devices has been largely discontinued.

Other forms of picking devices, such as long handled manual retrievers for individually picking the fruit from the trees and conducting same to a box or other container, are slow and generally ineffective as compared with the commonly accepted manual ladder picking.

The present invention is not only a solution to the ever increasing scarcity of manual labor for the picking, but is also a solution to the long sought problem of providing a practical fruit harvesting machine.

The machine comprises a tractor drawn vehicle or a power truck having a box body provided with picking mechanism on opposite sides thereof under the control of two operators for sequentially picking single and close groups of fruit from approximately one quarter of a vertical section of each of four trees and automatically conveying the picked fruit into the box body of the vehicle, which construction is a principal object of the invention.

Another object of the invention is the provision of a fruit transport vehicle having a telescopic boom assembly pivotally secured to each opposite side thereof with each assembly terminating in a power driven fruit picking head including independent power actuators for the independent operation of each boom assembly responsive to manual remote control means for controlling movement to an infinite number of positions of the picking head within a predetermined pyramidal range from its anchorage on the vehicle and additional remote controlled actuator means for extending and retracting the picking head to an infinite number of linear positions between predetermined limits.

A further object of the invention is the provision of a boom means having a power driven fruit picker at the outer end thereof with the boom pivoted at the opposite end for limited vertical and azimuthal movement including extension and retraction movement with remote controlled actuator means for moving the boom to an infinite number of positions in the aforesaid ranges.

Another object of the invention is the provision of a boom means pivotally secured to a vehicle having a fruit container thereof with the outer end of said boom terminating in a power driven fruit picking device with power means for operating the boom to an infinite number of positions within approximately one quarter of a radial section of a fruit tree.

Another object of the invention is a boom means having a fruit containing body articulated thereon with a power driven fruit picking device at the outer end thereof with power driven conveyor means for sequentially transporting fruit picked from the tree by the picker into the body of said vehicle.

These and other objects and advantages in one embodiment of the invention are described and shown in the following specification and drawings, in which:

FIG. 5 is a fragmentary cross sectional elevation of the rear portion of the boom assembly shown in FIG. 4.

FIG. 6 is a fragmentary view of the pivotal connection of the boom assembly to the carriage with portions thereof broken away.

FIG. 7 is a cross sectional plan view taken through section line 7—7, FIG. 8.

FIG. 8 is a rear end elevation of the boom assembly shown in FIG. 4.

FIGS. 9 and 10 are fragmentary side and plan elevations, respectively, of a motor and gear drive means alternate to the cam drive means shown in FIGS 4 and 5.

FIG. 12 is a side elevation of the boom and carriage therefor opposite that shown in FIG. 4 with the portions of the boom assembly broken away.

FIG. 13 is a bottom plan view of the picking elements shown in FIG. 12.

FIGS. 14 and 15 are schematic diagrams of the hydraulic power and actuating circuits in the machine.

FIG. 16 is a plan view diagram in greatly reduced scale showing the machine positioned to harvest fruit from one quarter of a radial section of each of four trees positioned in quadrature.

Figure 1:
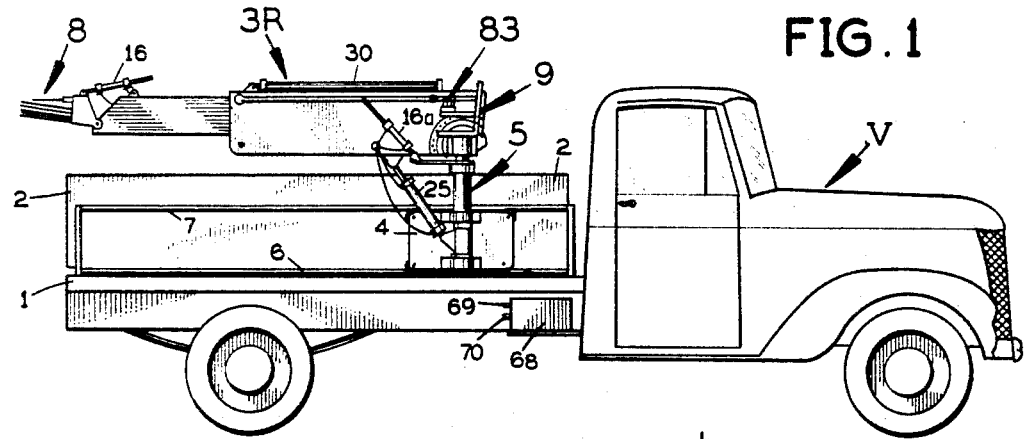
FIG. 1 is a right side elevation of the fruit picking machine in reduced scale.
Figure 2:
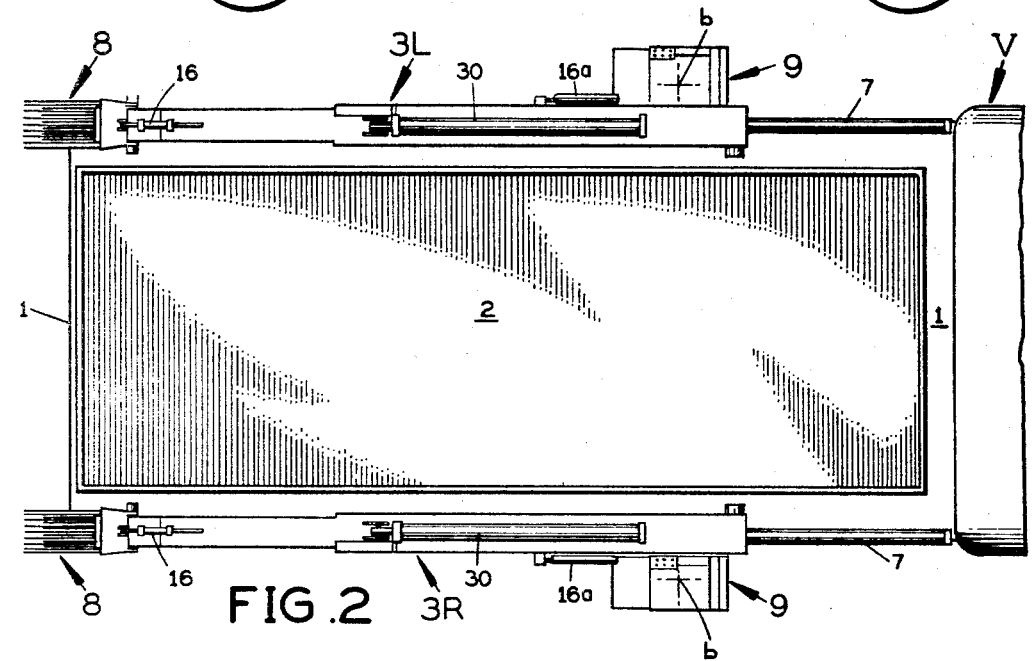
FIG. 2 is an enlarged fragmentary plan view of the machine shown in FIG. 1.
Figure 3:
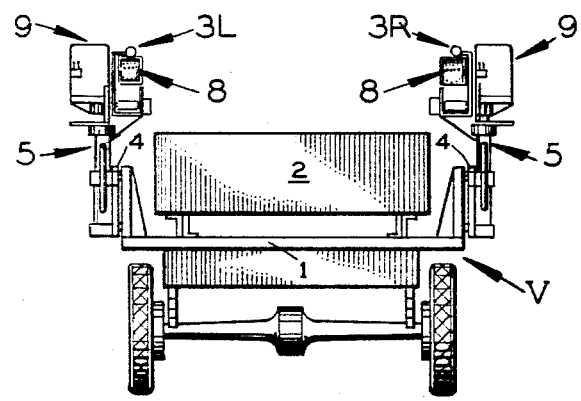
FIG. 3 is a rear elevation of the machine shown in FIG. 1.

FIGS. 1, 2 and 3 illustrate a power driven vehicle or conventional truck V with a fixed frame or bed 1 on which a box body 2 is usually retained by a hydraulic lift means, not shown, for raising the body and dumping the contents thereof when operated.

The fruit picking mechanisms comprise a pair of telescopic boom assemblies 3R and 3L which are pivotally secured for independent azimuthal movement about vertical axes on carriages or bases 4R and 4L supporting vertical pillar assemblies 5. Each of the carriages 4 is retained for reciprocation along rails 6 and 7 secured in vertical spaced parallel relation on opposite sides of the bed 1, thus providing for independent longitudinal movement of each of the boom assemblies 3 to an infinite number of positions along each side of the truck bed 1.

A slightly less convenient machine comprehends the omission of the movable carriages 4R and 4L by securing the equivalents to the carriages or bases 4 directly to the bed of the vehicle.

A power driven picking head 8 is pivotally secured to the outer end of each of the boom assemblies 3 for vertical movement about a transverse horizontal axis, which head is provided with a number of laterally movable tines 8t for dislodging the fruit from their supporting stems and including a plurality of fixed tines positioned to sequentially conduct the gravitating picked fruit in a predetermined rearward path. This device is described in detail in the aforesaid pending patent application Ser. No. 484,051.

A seat 9 for an operator is secured on the upper end of each pillar assembly 5 adjacent the rear portion of each boom assembly, as shown, with the latter shown in FIGS. 1, 2, and 3 in their idle rest positions for transport.

Figure 4:
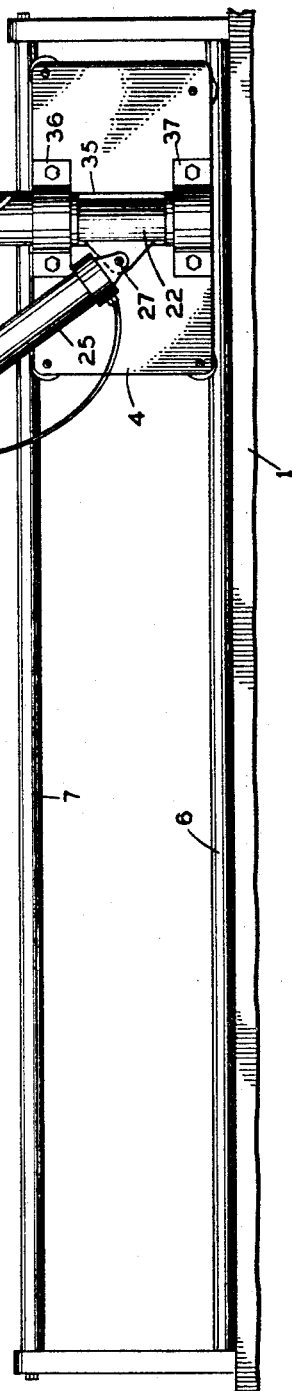
FIG. 4 is a right side elevation of the fruit picking boom assembly and carriage therefor shown in FIG. 1.

Referring to FIG. 4, the boom assembly 3 comprises a main boom member 10 having a channel shaped cross section which is supported for vertical movement about an axis a—a through a predetermined angle and azimuthal movement through a predetermined angle about a vertical axis b—b by means to be hereinafter described.

An outer boom member 11, also having a channel-shaped cross section, is positioned for telescopic extension and retraction in member 10 on flanged rollers 12—12 which are pivotally secured to the rear end portion of boom 11 by studs 13—13 retained in a slot 14 in boom member 10, as shown in FIGS. 4 and 8. Other frictional guide members, not shown, maintain boom 11 in proper telescopic alignment within boom 10.

The picking head 8 pivotally secured by a transverse stud 15 to the outer end of boom member 11 for limited vertical angular movement with respect to the latter. A double acting hydraulic slave cylinder 16 is pivotally secured at one end thereof to boom 11 by stud 17 with the outer end of piston rod 19 thereof pivotally connected to the upper side of the picking head by stud 18, as shown. In order that this particular hydraulic cylinder has equal effective area on both sides of the piston, for reasons hereinafter described, the piston rod 19 projects through a seal at the opposite end of the cylinder.

Referring to FIGS. 4, 6, and 7, the boom member 10 is pivoted for limited vertical angular movement by virtue of a circular bearing means comprising stationary member 20 having a circular outer periphery and a central cylindrical boss 21 extending through a bore in the wall of boom member 10 and fitted with a thrust washer 21t retained by a shoulder screw, as shown in FIG. 7. Member 20 is clamped to a hollow vertical pillar 22 by clamp member 23 by screw means and the outer periphery of member 20 is slidably retained by a circular guide 24. Thus the boom member 10 is pivoted for vertical angular movement and retained against lateral tilt.

The entire boom assembly is raised and lowered through a predetermined angle by a double acting hydraulic cylinder 25 which is pivotally secured at the lower end thereof to pillar 22 by stud 27 through anchor plate 41 secured in and projecting from pillar 22. The piston rod thereof is pivotally secured to boom member 10 by clevis 28 and a stud 29, as shown in FIG. 4. It is now apparent that when the cylinder 25 is actuated in either direction the entire boom will be raised and lower accordingly.

The boom member 11 is extended and retracted by the operation of a double acting hydraulic cylinder 30, the cylinder of which is secured to the upper side of boom member 10 with the piston rod thereof connected to boom 11 by clevis 30a and stud 31, as shown. Thus it is apparent that when the cylinder 30 is sequentially energized at opposite ends the boom member 11 will extend and retract accordingly.

Referring to FIG. 5, a like master cylinder 16a is pivotally secured at the upper end thereof to the side of boom member 10 by a second stud 17, not shown, and the piston rod 19a thereof is pivotally connected to bracket 32 by a stud 33, which bracket is secured to a flange 34 on pillar 22. Thus by properly proportioning the ratio of movement of the piston in the master cylinder 16 with the piston of the slave cylinder, a synchronous relation will exist between the two pistons and their respective piston rods which will maintain the picking head 8 in normal horizontal position regardless of the vertical angle assumed by the boom assembly.

Referring to FIGS. 5 and 8, each boom assembly 3 is required to be moved incrementally through an azimuthal angle of approximately 180 degrees in both directions from each side of the vehicle, as illustrated in FIGS. 2 and 16, and this movement is accurately accomplished by hydraulic means within the supporting pillar 22 for rotating same about its axis b—b by the action of a helical cam means in outer casing 35 which casing is rigidly clamped to carriage 4 by pillow blocks 36 and 37.

A ball thrust bearing 38 is positioned between a flange 34 on pillar 22 and a flange 40 on the upper end of casing 35 for providing minimum rotary friction resulting from the downward load of the boom assembly and the operator which is supported for azimuthal rotation about axis b—b.

It is to be noted that an anchor plate 41 is secured in pillar 22 for retaining stud 27 for pivotally mounting cylinder 25, shown in FIG. 5, and rectangular opening 42 is provided in the lower end of casing 35 to permit approximately 180 degrees rotation of anchor plate 41 about axis b—b, better shown in FIG. 8.

A double acting hydraulic cylinder 43 is positioned in the upper portion of the bore of pillar 22 with the piston rod thereof terminating in an offset pin 44, as shown in FIG. 5. The pin 44 is retained for reciprocation in a vertical slot 45 in pillar 22 and slidably projects through the steep helical slot 46 in casing 35, better shown in FIG. 8. Thus the pillar 22 and the entire boom assembly, including the operators seat, may be moved to an infinite number of positions between the 180 degree limit from either azimuthal direction when opposite ends of cylinder 43 are sequentially energized.

FIGS. 9 and 10 show a fragmentary alternate construction for the azimuthal movement of the boom using worm gear and rotary motor means instead of reciprocating hydraulic means, as shown in FIG. 5. A reversible hydraulic motor 47 is secured to the casing 35 and the worm driven thereby is engaged with worm wheel 49 secured to a flange on pillar 22. Thus the boom assembly may be moved in any position within 180 degrees in either azimuthal direction when the motor 47 is energized in a corresponding direction.

Referring to FIGS. 8, 12 and 13, the fruit released from its supporting stems by the picking head 8 is conducted rearward by gravity in the path of a first endless conveyor belt 50 which belt is provided with equi-spaced transverse rows of uprights 51, as shown, and is preferably made of molded reinforced elastomer material, such as rubber, with the uprights preferably slightly resilient to avoid bruising the fruit. The first conveyor belt is supported within boom member 11 by rearward and forward pulleys 52 and 53, respectively, which in turn are retained on axles 54 and 55 which are journalled for rotation in opposite sides of boom member 11.

It is now apparent that when the conveyor belt is rotated in the direction shown by arrows the fruit gravitated from the collector tines of the picking head will be sequentially engaged by the conveyor uprights 51 and carried rearward, as illustrated in FIG. 12.

Figure 11:
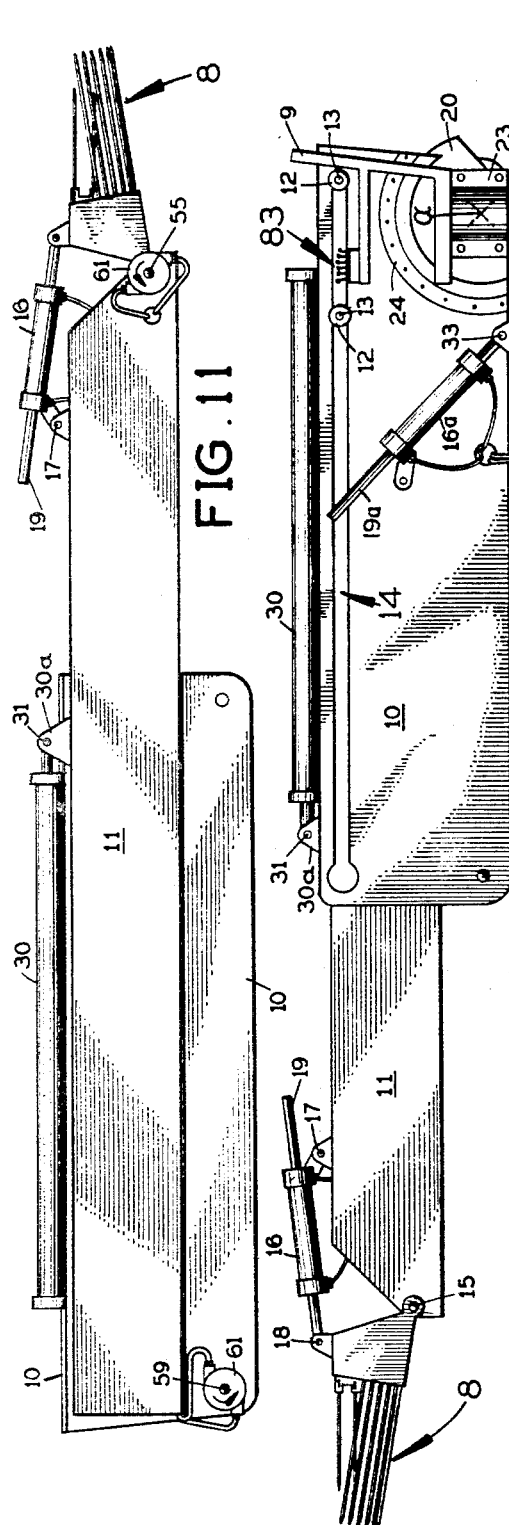
FIG. 11 is a fragmentary side elevation of the boom assembly opposite that shown in FIG. 4.

A second conveyor belt 56, retained within boom member 10, has the same spaced uprights 51 extending therefrom and is journalled for rotation on pulleys 57 and 58, respectively, which are secured to axles 59 and 60, respectively, and the axles are journalled for rotation in opposite sides of boom member 10. Referring to FIG. 11, a unidirectional hydraulic motor 61 is coupled to each axle 59 and 60, respectively, for rotating each conveyor at substantially the same predetermined speed.

Again referring to FIG. 12, a flexible fruit conducting conduit 62 is secured to the rear of boom member 10 in register with the rear end of the conveyor belt pulley of conveyor 56.

It is now apparent that regardless of the extension of boom member 11 with respect to boom member 10, the fruit illustrated in dotted lines will sequentially gravitate from the picking head 8 and will be first fed rearward on conveyor belt 50 and then by gravity descend to conveyor belt 56 for continued rearward movement into conduit 62 for distribution into the box body of the vehicle V.

In order to increase the versatility of picking trees that are not positioned in symmetrical order and more uniformly load the box body with the picked fruit, each of the boom assemblies may be independently moved longitudinally by remote control means the length of the body on rails 6 and 7.

Referring to FIGS. 4, 8, and 12, the carriage 4 is retained by the rails or gibs 6 and 7 fixed to the body and the carriage is reciprocated on the gibs on grooved wheels 63, which wheels are journalled on studs 64 secured in carriage 4.

Referring to FIG. 12, a reversible hydraulic gear motor 65 is secured to carriage 4 with the drive pinion 66 thereof meshed with a driven gear 67 coaxially secured to one of the lowermost wheels 63, as shown. Thus it is apparent that the carriage 4 and the boom assembly can assume an infinite number of positions between the positions shown in full lines and dotted lines by the predetermined rotation of the motor 65 in either direction. An alternate construction eliminates the gear train by direct connection of the gear motor to a wheel 63.

FIG. 14 is a diagram of the hydraulic system used in the machine with a source of hydraulic energy, illustrated by block 68 and driven by shaft 80, which block is intended to contain a conventional power driven hydraulic pump, a sump, a bypass relief valve and a filter, not shown. The power source 68 is provided with an output manifold 69, for distribution of the hydraulic fluid at relatively high pressure in the order of 800 to 1,000 p.s.i., and a return or input manifold 80 to which all of the actuators and control valves are connected.

A conventional unidirectional hydraulic motor 71 for driving the picker head 8 is connected to and controlled by reciprocating one-way throttle valve 72 which in turn has the input and output connected to manifolds 69 and 70, respectively. A pair of hydraulic motors 61 for driving the conveyors are parallel connected to and controlled by another one-way throttle valve 75 which has the input and output thereof connected to manifold 69 and 70.

A reversible gear motor 65 for driving the carriage 4 in opposite directions is connected to a reversible manual two-way throttle valve 76 which has input and output connections thereof connected to manifolds 69 and 70, respectively.

A double acting hydraulic cylinder 25 for moving the assembly 3 in azimuthal direction is connected to another reversible two-way throttle valve 77, the input and output of which are connected to manifolds 69 and 70, respectively.

The double acting cylinder 43 for moving the boom assembly 3 in azimuthal direction is connected to another two-way valve 78 which has the input and output thereof connected to manifold 69 and 70, respectively.

A double acting hydraulic cylinder 30 for extending and retracting boom member 11 to and from boom member 10 is connected to another reversible two-way throttle valve 79 with the input and output thereof connected to manifolds 69 and 70, respectively. When the circuit is filled with conventional hydraulic fluid and the pump shaft 80 power driven and each of the valves operated, its corresponding actuator will function with the speed and position dependent upon the manual operation and movement of each of the valves.

It is understood that all of the throttle valves illustrated in FIG. 14 may be either the spool type or rotary type.

Figure 17:
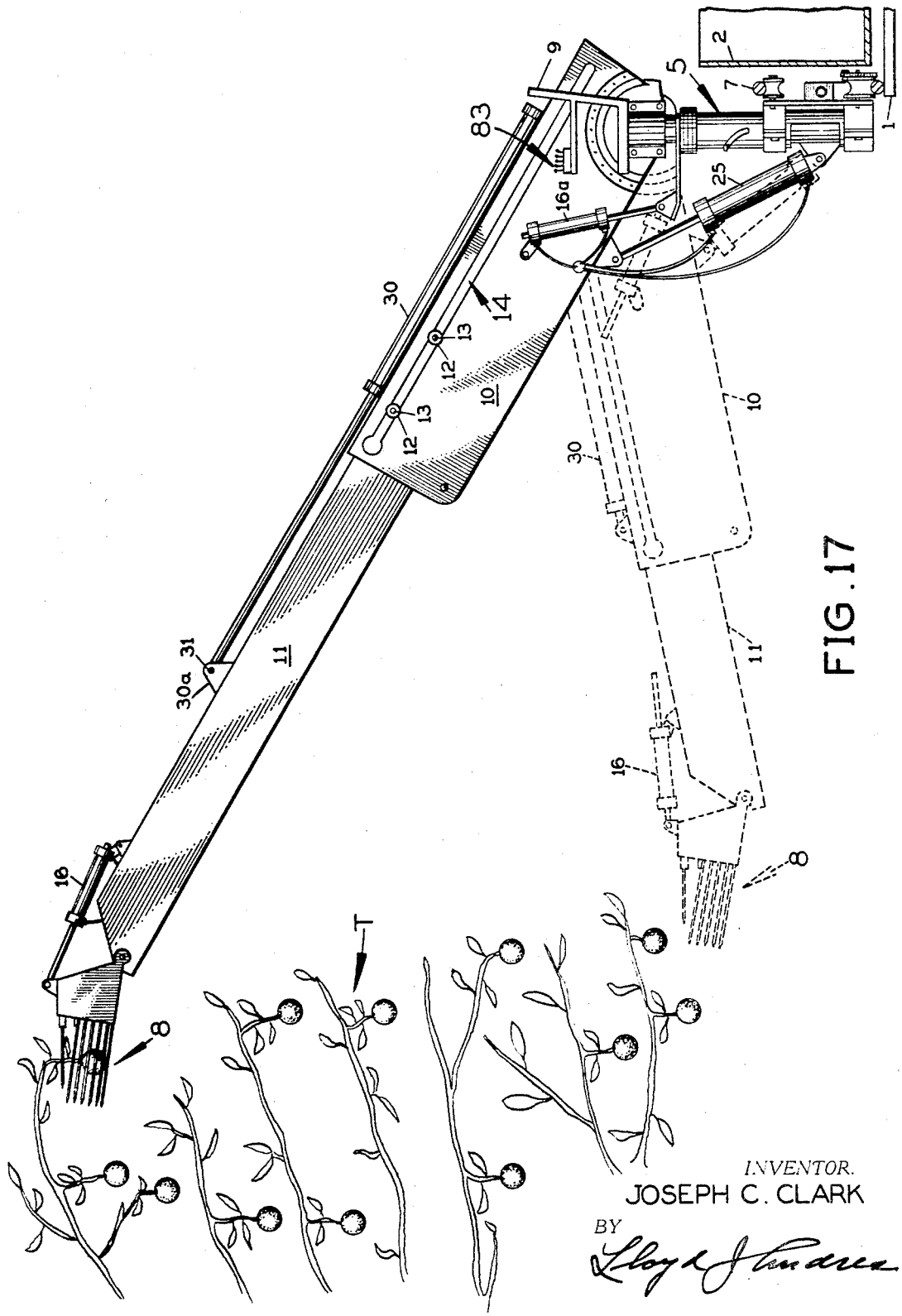
FIG. 17 illustrates the range of the boom assembly from its uppermost extended position to its lowermost retracted picking position.

The group 83 of all of the control levers of all of the valves shown in FIG. 17 are conveniently grouped at a position convenient for operation by the occupant operator in chair 9. It is to be noted that the chair 9 for each operator and the group 83 of levers may be positioned in another convenient location on the vehicle, as well as on the pillar assembly 5, as shown.

Referring to FIG. 17, the picker head is maintained in its substantially horizontal position regardless of the vertical angle of the boom assembly by the synchronous action of a pair of double acting cylinders 16 in which the input of one cylinder is connected to the output of the other and vice versa by conduits 81 and 82, as shown, with a small reservoir and filler pipe 84 connected in series with conduit 82 for filling the circuit with hydraulic fluid. It is now apparent from FIG. 4 that when the vertical acting cylinder 25 is actuated, the master cylinder 16 on boom member 10 will act simultaneously and the transfer of fluid from one side of the piston thereof to the other piston in the slave cylinder 16 connected to the picking head to move through a like distance will hold the working position of the picking head at a constant attitude for vertical picking.

It will be understood by those skilled in the hydraulic control art that certain of the conduit connecting the hydraulic actuators and the control valves will be made of both rigid tubing and flexible hydraulic hose because the use of the latter is required when the actuators are subject to operative movement.

It will also be understood that well known rotary-port valves may be substituted altogether or in part for the conventional reciprocating spool type valves with equal results.

An alternate means for holding the picking head in a constant position may be accomplished by the use of a quadrant bevel gear attached to pillar 22 coaxial with the axis a and a like quadrant gear attached to the picking head coaxial with the horizontal axis thereof with a telescope shaft journalled along the boom assembly with a pinion at each opposite end thereof meshed with each of the aforesaid gears. Thus the vertical angular movement of the boom assembly will maintain and rotate the gear train to hold the picking head in its constant working attitude like the hydraulic system above described.

It is also to be understood that in the event electric power is available in an orchard or in the vehicle, an electric actuation system may be employed using electric power actuators or gear motors under the control of conventional switches and/or variable power controllers.

In operation and referring to FIG. 16, it is now apparent that when the box body 2 of the vehicle V is centrally positioned with respect to four trees T the picking heads of the boom assembly may be precisely positioned in and around and up and down one quarter sector of each of four trees, with the boom movable to an infinite number of positions within a solid tetrahedron space, as illustrated by dot-dash lines. It will also be apparent that when the trees are not positioned in exact quadrature that each boom assembly may be traversed along the vehicle to accommodate the irregular positions of the trees. FIG. 17 illustrates the vertical movement of the picking head when extension and retraction is required to cover the complete vertical picking of a section of the tree.

It is understood that certain modifications in the construction, utilizing the features above described, including Having described my invention, I claim:

1. A fruit harvesting machine comprising a land vehicle for positioning in proximity to a fruit bearing tree in an orchard,
   a boom carriage base retained on a rail means secured to said truck for horizontal movement to a plurality of positions along one side thereof between fore and aft limits,
   a reversible gear motor means on said carriage for reciprocating the latter to each of said plurality of positions when momentarily energized in either direction,
   a boom means pivotally secured to said carriage adapted and constructed for predetermined lateral universal angular movement,
   a power operated fruit picking head secured to the outer end of said boom means for engaging and dislodging fruit from their stems in said tree and conducting said picked fruit therefrom when moved into a picking position in said tree and energized,
   a plurality of power actuator means operatively associated with said carriage and said boom means for moving said head into a second plurality of picking positions when selectively operated and energized,
   a source of energy,
   a plurality of independent manually operated control means corresponding and connected to each of said plurality of actuator means respectively and connected to said source of energy whereby said head will sequentially engage and pick said fruit from a predetermined sector of said tree when said carriage and said boom means and said head is operated and energized and when said carriage has moved said boom into the range of said tree and said boom has moved said head into sequential engagement with said fruit on said tree.

2. The construction recited in claim 1 including an operators seat means secured to said carriage adjacent the rear portion of said boom means for lateral movement therewith and said control means positioned on a portion of said seat means convenient an operator seated thereon.

3. In a machine of the character described a vehicle adapted for mobile movement to a position in picking proximity with at least two fruit bearing trees,
   a power operated boom carriage means on the side of said vehicle adapted and constructed for horizontal reciprocal movement along said side to any position between predetermined limits when selectively operated and energized,
   a boom means pivotally secured at one end portion means thereof to said carriage means for movement to any vertical position within the limits of a predetermined vertical angle from said side of said vehicle,
   a power operated fruit picking head secured to the outer end of said boom means,
   a power actuator means connected and articulated with said carriage and boom means for moving the latter to any selected position within said angle when selectively operated and energized whereby the selective operation of said carriage means and said actuator means will selectively register said head with selected fruit on portions of said trees for picking said fruit therefrom.

4. In a machine of the character described a vehicle adapted for mobile movement to a position in picking proximity with fruit bearing trees in an orchard,
   a container means on said vehicle for receiving fruit picked from said trees,
   a power operated main boom means pivotally connected at one end portion thereof to said vehicle for movement to any vertical position within the limits of a predetermined substantially vertical angle when operated,
   a first power driven endless belt conveyor means journalled at opposite ends thereof on said main boom means and positioned colinear therewith for moving said fruit gravitated thereon into said container means when operated,
   a power operated boom extension member slidably retained to said main boom means in colinear relation for selective telescopic movement therewith to any position between predetermined limits when operated,
   a power operated picking head connected to the outer end of said extension means for selectively engaging and dislodging said fruit from said trees when operated,
   a second power driven endless power conveyor means journalled at opposite ends thereof on said extension member and positioned colinear therewith in a path for movement parallel and above said first conveyor means when said extension is reciprocated to a selected position for conveying rearward the said fruit picked by said head for deposit on said first conveyor when operated whereby said fruit will be conveyed from said head into said container when said boom means and said extension member are in any of their said positions.

5. In a machine of the character described a base means adapted for mobile movement to a position in proximity with a fruit bearing tree,
   a power operated boom means connected by one end portion thereof to said base means for movement about a horizontal axis to any vertical position within the limits of a predetermined vertical picking angle when operated,
   a boom actuator means operatively associated with said base means and said boom means for moving the latter into a selected vertical position when selectively operated,
   a power operated picking head pivotally journalled for oscillation within a like said angle about a transverse horizontal axis at the outer end portion of said boom means,
   a double acting hydraulic master actuator operatively connected between said base means and said boom means for operation by the latter,
   a double acting slave actuator operatively connected with the said end portion of said boom means and said head,
   hydraulic circuit means connecting said master and said slave actuators for the simultaneous and synchronous operation of said slave actuator by the operation of said master actuator when operated by the vertical movement of said boom means when the displacement and movement of said master and said slave actuators are in predetermined proportion whereby said head is maintained at a predetermined fixed attitude when said boom means is moved into any said selected vertical position within said picking angle.

References Cited

UNITED STATES PATENTS

| | | | |
|---|---|---|---|
| 2,586,834 | 2/1952 | Krelsman | 56—328 |
| 2,690,639 | 10/1954 | Goodwin | 56—328 |
| 2,940,623 | 6/1960 | Shook. | |
| 3,077,720 | 2/1963 | Grove et al. | 56—328 |
| 3,329,291 | 7/1967 | Prezybylski et al. | |

ABRAHAM G. STONE, *Primary Examiner.*

P. A. RAZZANO, *Assistant Examiner.*